W. G. CANION.
COMBINED AIR AND ELECTRIC TRIPLE VALVE.
APPLICATION FILED JUNE 7, 1915.

1,280,157.

Patented Oct. 1, 1918.
5 SHEETS—SHEET 1.

Witnesses
Fredk L. Fox.
C. C. Hines

Inventor
William G. Canion
By Victor J. Evans
Attorney

W. G. CANION.
COMBINED AIR AND ELECTRIC TRIPLE VALVE.
APPLICATION FILED JUNE 7, 1915.

1,280,157.

Patented Oct. 1, 1918.
5 SHEETS—SHEET 5.

UNITED STATES PATENT OFFICE.

WILLIAM GEORGE CANION, OF BALTIMORE, MARYLAND.

COMBINED AIR AND ELECTRIC TRIPLE VALVE.

1,280,157.

Specification of Letters Patent.

Patented Oct. 1, 1918.

Application filed June 7, 1915. Serial No. 32,696.

*To all whom it may concern:*

Be it known that I, WILLIAM G. CANION, a citizen of the United States, residing at Baltimore, State of Maryland, have invented new and useful Improvements in Combined Air and Electric Triple Valves, of which the following is a specification.

This invention relates to certain new and useful improvements in triple valves for air brake systems and particularly to a combined air and electrically controlled valve of this character.

One object of the invention is to provide a triple valve of the rotary type which is simple of construction, comparatively inexpensive of production and installation, which is not liable to get out of order but is capable of being easily and conveniently repaired when occasion requires, and which is of maximum durability, efficiency and reliability in use.

A further object of the invention is to provide a triple valve which may be applied to and employed in any ordinary air brake system, and which is sensitively responsive to variations of pressure whereby its positive movement to its different working positions is rendered positive and insured.

A still further object of the invention is to provide a duplex rotary valve, one member of which is controlled by air pressures in the usual way for performing the usual functions of applying and releasing the brakes and charging the auxiliary reservoir, including an emergency application, and the other member of which is adapted to be electrically operated for an extra rapid emergency action independent of or in conjunction with the air valve, or to serve in case of any failure of the air valve to act.

With these and other objects in view, the invention consists of the features of construction, combination and arrangement of parts herein fully described and claimed, reference being had to the accompanying drawings in which:—

In carrying my invention into practice, I provide a valve structure including a casing composed of an air chest or pressure chamber 1 and a valve chamber or casing proper 2. The pressure chamber 1 is provided in its opposite sides with passages 3 and 4 respectively for connection with the train pipe 5 and the auxiliary reservoir pipe 6, and these passages 3 and 4 communicate with an intermediate pressure chamber 7. The chest 1 is divided on a vertical longitudinal line into two separable sections 8 and 9 having flanges 10 and 11, and said chest is adapted to fit within and to be sustained by an annular supporting member or ring 12, against which the flanges 10 and 11 abut. Screws 13 extend through the flanges and into the side edges of the ring 12 and detachably secure the parts of the air chest in position, the construction being such that upon removing the screws the parts of the chest may be disassembled for convenience in gaining access to the interior thereof, for repairs and other purposes. Packing rings or gaskets 14 are interposed between the flanges 10 and 11 and ring 12 to form tight joints, and a packing ring or gasket 15 is also secured to one of the chest sections so as to come between the meeting faces of the chest sections and marginally surround the chamber 7 to prevent leakage, as will be readily understood.

The supporting ring 12, which forms an intermediate part of the body of the air chest, holding the sections thereof assembled, is connected with the valve casing 2 which is provided at its base with a flange 16 through which pass fastening screws 17 entering threaded openings in the ring 12 and side flanges 18 on the sections 8 and 9 of the air chest, whereby upon detaching certain of said screws the sections 8 and 9 of the air chest will be disconnected from the valve casing while the supporting ring 12 remains fastened thereto, allowing the chest sections to be disassembled without disturbing the supporting ring, while by detaching the remainder of the screws 17 the air chest as a whole may be detached from the valve casing. As shown, the valve casing is carried by a bracket plate 19 which is detachably secured by screws 20 to the inner end of the brake cylinder 21, with which the valve casing is in communication through a combined admission and exhaust port 22.

The valve casing is provided with a bore or chamber 23 to receive a hollow rotary plug valve 24 and a hollow rotary plug valve 25, said valves being coaxially mounted, the valve 25 being arranged for operation within the valve 24, as shown. With this bore or chamber 23 communicate an admission or feed port 26 leading from the passage 3, an admission or feed port 27 leading from the passage 4 or the auxiliary reservoir side of the chamber 7, a delivery port 28 leading to the brake cylinder port 22, an exhaust port 29 leading to the atmosphere, and an auxiliary exhaust port 30 leading to a manually operable pressure retaining valve 31. The port 30 communicates with a segmental recess 32 extending part way around the bore or chamber 23, for a purpose hereinafter described.

The valve 24 is adapted to be controlled as usual by variations of pressure in the train pipe and auxiliary reservoir for the purpose of performing the ordinary triple valve functions, that of charging the auxiliary reservoir and applying and releasing the brakes, including service and emergency actions. The valve 25, on the other hand, which forms a slotted core for the valve 24, is designed to be controlled or operated electrically for the purpose of securing an extra rapid emergency application or to enable the brakes to be controlled in the event of the possible derangement of the valve 24.

The valve 24 is provided mainly on one side of its center with a recharging port 33, a pair of feed ports 34 and 35 and an exhaust port 36, and is provided on the opposite side of its center with a delivery port 37 of greater width than any of the aforesaid ports, an auxiliary or secondary exhaust port 38, and an exhaust pocket or recess 39. The valve 25 is also provided with ports for coöperation with the ports of the valve 24, and these ports in the valve 25 consist of a comparatively wide feed port 40, a delivery port 41 and an exhaust port 42, the last-named port having an enlarged or widened inlet end. The valves normally stand in the relative position shown in Fig. 3, which indicates the running position of the triple valve when the train pipe and auxiliary reservoir pressures are equalized. In all the positions of the valve 24, the valve member 25 remains fixed or stationary with respect to the valve 24, except when said valve member 25 is independently operated, the air feeding through the communicating ports of both valve members in the control of the brake mechanism by the air valve 24. When the parts are in the running position, as above stated, and as shown in Fig. 3, the ports 33 and 34 are in partial registry with the ports 26 and 27, and in full communication with the ports 40 and 41 of the valve 25, but the brake cylinder feed port 37 is wholly out of communication with the brake cylinder passage 22, which communicates with the atmosphere through the ports 38, 42 and 29.

A check valve 43, preferably of the ball-type, is provided to close the port 26 against back pressure, and a fluid pressure influenced element is provided in the chamber 7 for operating the valve 24. This element comprises a flexible diaphragm 44 which is clamped between the gasket 15 and the section 9 of the air chest and has secured thereto a plate or vane 45 fastened to a stem 46 suitably journaled upon the air chest. This diaphragm is subjected on one side to train pipe pressure and on its opposite side to auxiliary reservoir pressure, and subdivides the chamber 7 into two pressure cavities in which such pressures are maintained by direct communication between said cavities and the respective pipes 5 and 6, the vane or plate 45 constituting a rigid member which renders the diaphragm sufficiently stiff for the purpose and forms an operating connection between said diaphragm and the stem 46, whereby said stem is adapted to be moved in opposite directions by reductions of pressure in the train pipe and auxiliary reservoir, respectively. The upper end of the stem 46 has an angular head 47 which seats within an angular socket 48 in the valve 23, thus operatively connecting said valve for rotary motion from the diaphragm, while at the same time permitting the valve to be lifted out of engagement with the stem upon the removal of the casing 2, and the stem to be withdrawn from engagement with the valve when the chest is disconnected, for convenience in disassembling as well as in assembling the various parts. A spring 49 carried by the stem and seated in a recess 50 in the valve chest is arranged to bear against the valve 24 to support and hold said valve properly seated. The valve 25 has an exteriorly projecting stem 51 which is coupled by a crank arm 52 with the movable core 53 of a solenoid 54, arranged in a suitable electric circuit, whereby upon closing said circuit the solenoid may be energized to rotate the valve 25 to perform its intended function, the solenoid core and valve being returned by a spring or other suitable means to the normal or neutral position shown in Fig. 3. Valve 25 remains in the position shown in Fig. 3 with reference to valve 24, except when operated electrically for extra rapid emergency action, as hereinafter described. The spring 49 above mentioned not only seats valve 24 but firmly seats valve 25 within valve 24 so that in view of the frictional contact, the two valves will rotate together under the conditions shown in Figs. 3 to 6. When the solenoid is energized, however, sufficient force is applied to the crank arm 52 to effect the rotation of valve 25 independently of valve 24.

Figure 1:
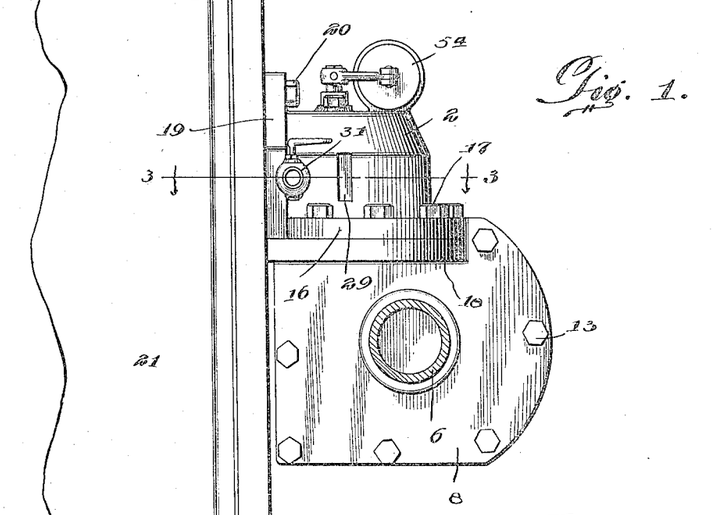
Figure 1 is a view in side elevation of my improved triple valve, showing also the brake cylinder.
Figure 2:
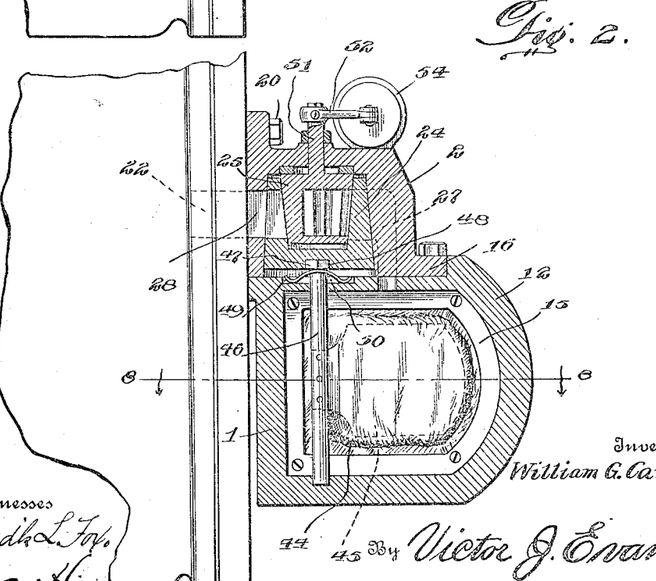
Fig. 2 is a central vertical longitudinal section through the valve shown in Fig. 1.
Figure 3:
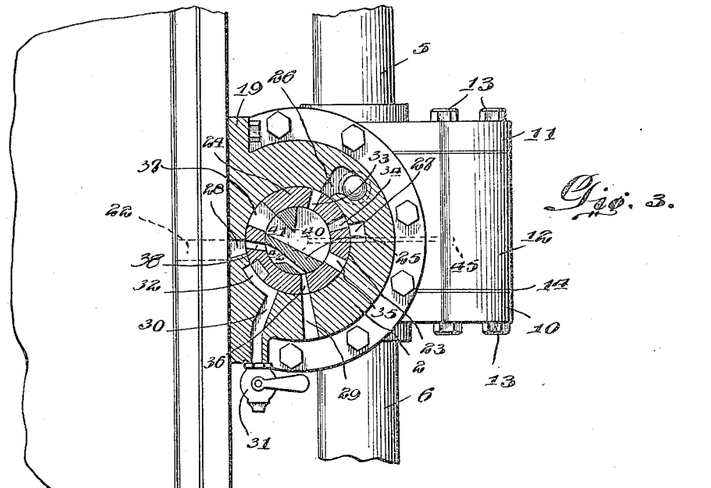
Figs. 3, 4, 5, 6 and 7 are horizontal transverse sections, taken on the line 3—3 of Fig. 1, showing the valve in different positions.
Figure 4:
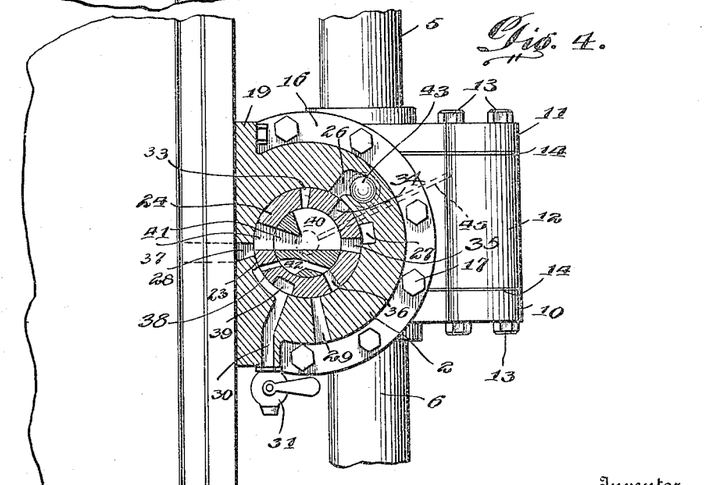

It will thus be understood that under normal conditions the valve members are arranged in the running position described and as fully shown in Fig. 3. When it is desired to adjust the triple valve for a service application to the brakes, the engineer's brake valve is operated to reduce the train pipe pressure to a predetermined degree, say five pounds, whereupon the preponderating auxiliary reservoir pressure in the chamber 7 will move the diaphragm 44 from the normal or neutral position shown in Fig. 3 to that shown in Fig. 4, in which the diaphragm is shifted to a mid position between its normal position and the outer wall of the train pipe pressure side of the chamber 7, thereby shifting the valve 24 to the position shown in Fig. 4. In this position the port 33 has been moved out of communication with the port 26, while the port 42 is cut off from communication with the ports 28 and 29, but the port 35 communicates with the port 27 and the port 37 with the port 28, thus establishing communication between the auxiliary reservoir and the brake cylinder for a service application of the brakes. When the valve 24 is returned to the running position shown in Fig. 3, through a restoration of the normal pressure in the train pipe, the ports 42, 28 and 29 are again brought into registry for the exhaust of the air from the brake cylinder to the atmosphere, whereby the release of the brakes is effected.

Figure 5:
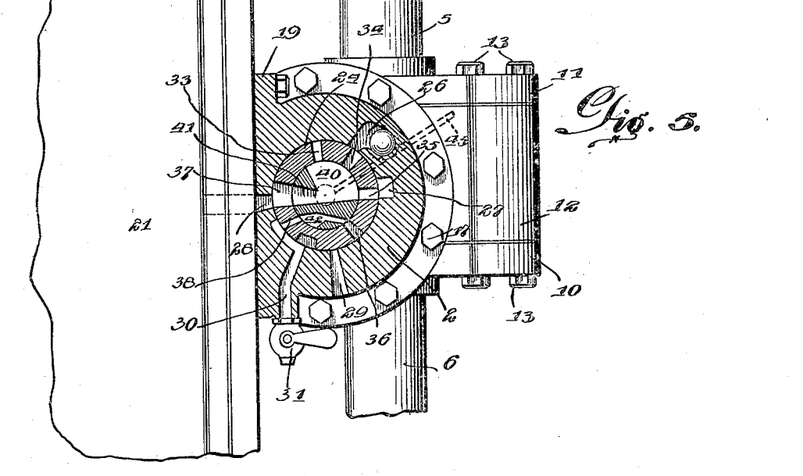

In adjusting the triple valve for an emergency action through the medium of the air valve 24, the engineer's brake valve is moved to a position to reduce the pressure in the train pipe to a still greater degree than for the service action described, and as a result the diaphragm will be moved toward the train pressure side to the position indicated in Fig. 5, in which position the valve member 24 is set or adjusted to establish communication between the brake cylinder and both the auxiliary reservoir and the train pipe through the ports 26 and 27, 34 and 35, 40 and 41 and 37, 28 and 22, thus augmenting the normal auxiliary reservoir pressure by pressure from the train pipe for a quick and powerful application of the brakes. Upon the return of the engineer's brake valve to normal position and the restoration of normal pressure in the train pipe, an equalization between the pressures on the opposite sides of the diaphragm 44 in the chamber 7 will occur, and said diaphragm will be returned to normal position and will adjust the valve 24 back to the running position illustrated in Fig. 3, the air exhausting from the brake cylinder through the valve to the atmosphere in the manner previously described.

Figure 6:
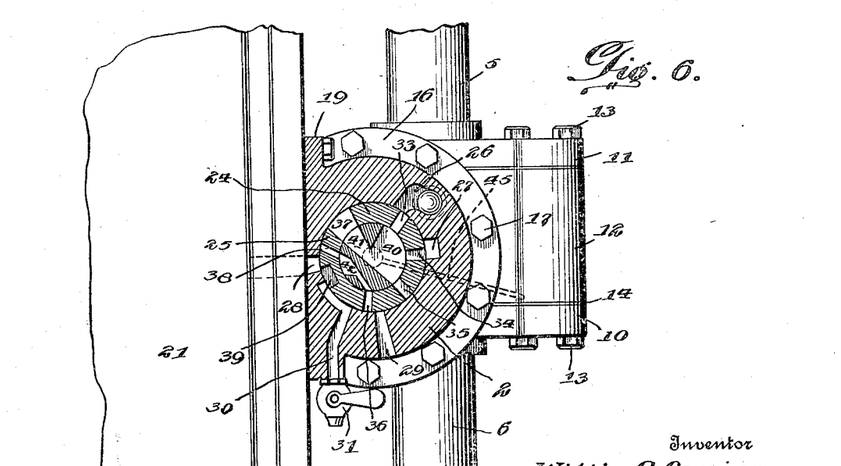

If from any cause, such as leakage, the auxiliary reservoir pressure should decrease below train-line pressure, the diaphragm is shifted toward the auxiliary reservoir side of the chamber 7 by the preponderating pressure in the train pipe, and as a result of this operation the valve 24 is shifted in the opposite direction to those previously described to establish communication between the train line and auxiliary reservoir and cut off communication between the same and the brake cylinder, as shown in Fig. 6. In this adjustment of the valve, the ports 33 and 34 connect the ports 26 and 27, which are cut off from communication with the port 28 and the exhaust ports, the recess 39 in this operation being shifted to connect the port 28 with the auxiliary exhaust port 30 so that release of the brakes may be effected while the operation of recharging the auxiliary reservoir is being carried on. When the auxiliary reservoir pressure and train pipe pressure are equalized the parts are returned to the normal position shown in Fig. 3.

Figure 7:
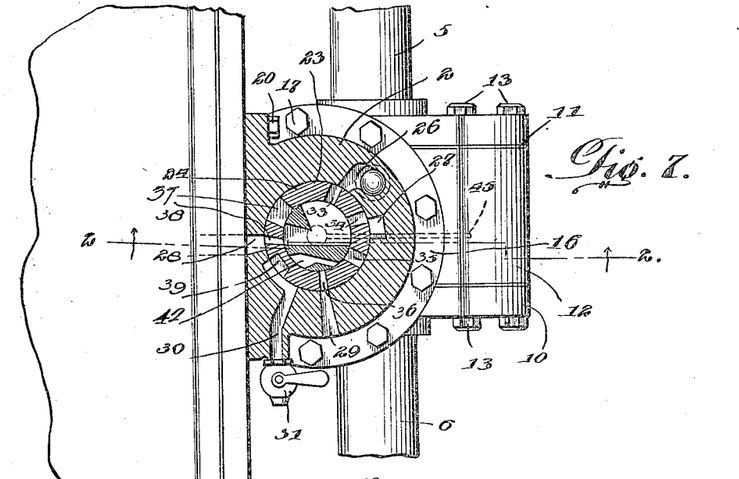
Figure 8:
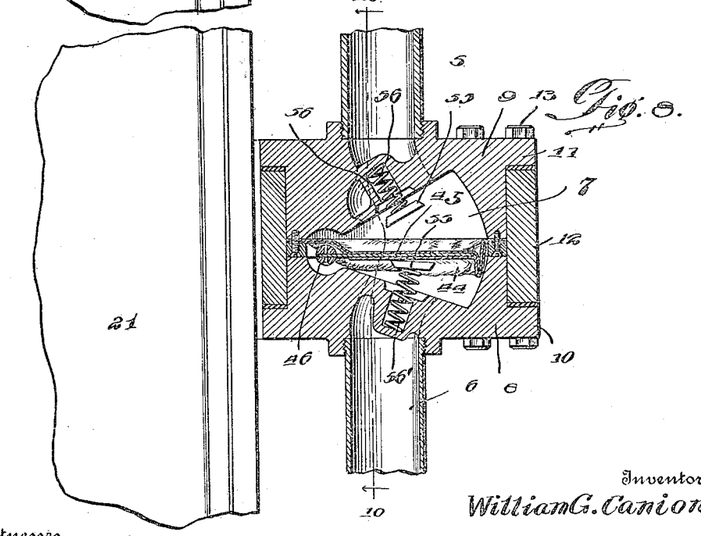
Fig. 8 is a horizontal transverse section on the line 8—8 of Fig. 2.
Figure 9:
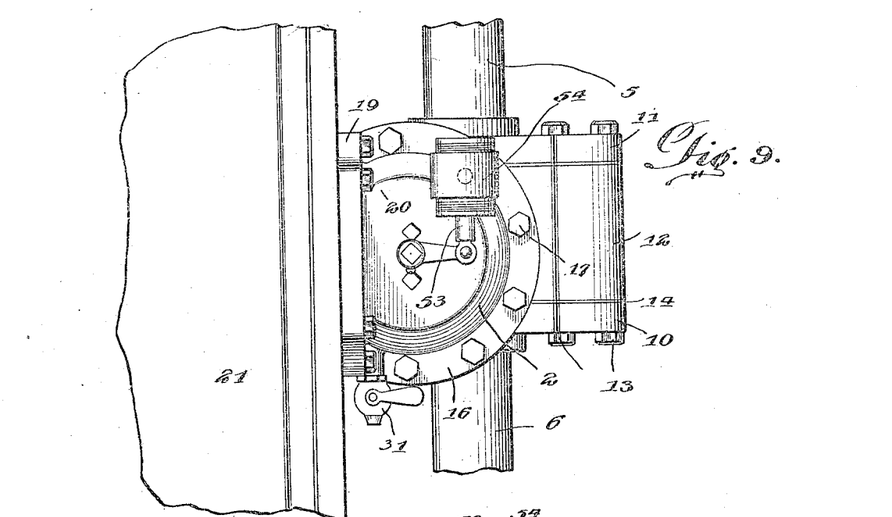
Fig. 9 is a top plan view of the valve.
Figure 10:
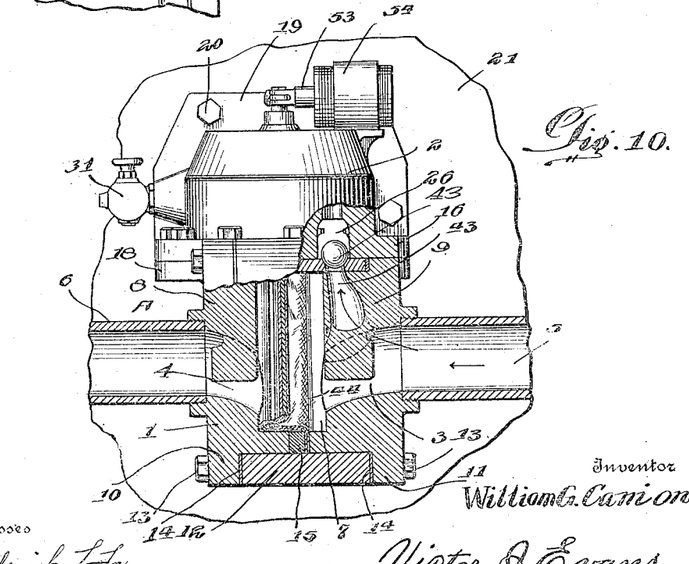
Fig. 10 is a vertical transverse section on line 10—10 of Fig. 8.

If for any reason it should be desired to obtain an extra rapid emergency action, or to control the brakes in the event of sticking or other derangement of the valve member 24, this may be effected by closing the electric circuit to operate the electric valve 25. This valve, which may be connected up with the solenoid core to rotate in either direction, is in the present instance shown as connected with the core to rotate to the left in Fig. 7, and as a result of its adjustment, the valve 24 remaining in the normal or running position, communication will be established through the ports 33 and 34 with both the train pipe and the auxiliary reservoir, and the air will flow through the ports 40 and 41 and the exhaust port 38, which in this operation acts as a delivery port, to the brake cylinder to effect the emergency application of the brakes, the brakes being held applied until the valve 25 is returned to normal position, when the brakes will be released by the exhaust of air through the normal exhaust passages 28, 38, 42 and 29, as will be readily understood.

An important advantage resulting from the provision and use of the electric valve is, that higher efficiency can be obtained for rapid application of the brakes and maintenance of the same in application, owing to the fact that the valve secures the direct supply of air from the train line which is constantly and rapidly being recharged from the source of supply. The action of the electric valve is of advantage over an emergency action of the air valve in that high pressure, of 70 pounds or more, can be maintained in the brake cylinder regardless of other factors or conditions, such as range of piston travel.

Under all normal running conditions the valve 31 is left open, so that a release of the brakes may be effected whenever desired while the auxiliary reservoir is being recharged. This valve, however, may be closed whenever it is desired to retain the brake pressure within the brake cylinder, as when the train is descending a grade, while the auxiliary reservoir is being recharged, it being understood, of course, that the valve 31 is manually closed at the top of the grade and afterwards opened when the train reaches the bottom of the grade, so that the pressure retaining action may be carried out only when necessary and under the condition mentioned, while at all other times the brake will operate in the usual manner to perform its ordinary functions.

Bumpers 55 and 55' are respectively provided in the train line and auxiliary reservoir sides of the chamber 7 to cushion the reverse movements of the diaphragm, said bumpers being respectively backed by cushioning springs 56 and 56'.

These springs serve to prevent unduly rapid or violent motions of the diaphragm and also serve other important functions. The spring 56' on the auxiliary side of the chamber 7 serves to return the valve 24 to normal position after the pressures on opposite sides of the diaphragm are equalized. It is while this spring is compressed that exhaust port 30 is in communication with port 28. If valve 31 is closed, then the exhaust is retarded until the auxiliary reservoir has equalized with the train line and the spring 56' has shifted valve 24 back to its normal position, connecting ports 42, 28 and 29. On long trains, such as a hundred car train, it takes some six or seven minutes to recharge after brakes have been applied. During the time of recharging, spring 56' on auxiliary side of diaphragm will remain compressed, preventing release of the brakes, and, in case it is necessary to release the brakes before the train line has fully recharged, it is only necessary to bring the engineer's brake valve back to lapped position, whereupon the train line and auxiliary reservoir pressures will equalize and bumper spring 56' on auxiliary side will bring diaphragm back to normal position, releasing the entire train as a unit. In this same function a great benefit is had in case of interchanging with other brakes. For instance, if the diaphragm triple is in the train on the head end and the engineer desires to release the rear end of the train first, the spring bumper 56' on auxiliary side of diaphragm enables him to retard the release of the brakes on the head cars, while the rear brakes are being released, thus preventing accidents from cars buckling in the train. In case the diaphragm triple is in the rear end of the train, it can be released in advance of other triples of standard type within a reasonable distance in the lead by throwing the engineer's valve to full release and back to lapped position. The spring 56 on the train line side of the chamber 7 is of material importance, equally so with the spring 56'. In making a reduction for service application, say 5 pounds, the diaphragm moves toward the bumper 55 until it strikes the same, at which time its motion will be arrested. For an emergency application, the air must be reduced in the train line side with sufficient rapidity in excess of the flow of the auxiliary air to brake cylinder to compress spring 56, which has a tensional resistance preferably of about 12 pounds per square inch, thus sensitively controlling the action of the diaphragm for an emergency application, since the train line pressure in the chamber 7 must be 12 pounds below the auxiliary reservoir pressure before the spring 56 is compressed to any great degree. The spring 56', therefore, returns the valve to normal position after reduction of auxiliary reservoir pressure and when such pressure is again augmented and equalized with the pressure in the main line, while the spring 56 permits and checks the movement of the diaphragm in service application under a service reduction in the train line and permits further movement of the diaphragm for an emergency action when the pressure in the train line is decreased to a predetermined additional extent.

From the foregoing description, taken in connection with the drawings, the construction, mode of operation and advantages of my improved triple valve will be readily understood without a further and extended description, and it will be seen that the invention provides a valve of this character which embodies all of the desirable advantages stated, and which in addition to providing a rotary valve of a simple type to perform the usual triple valve function, also provides a valve which may be operated electrically for emergency or safety purposes, insuring control of the train under any and all conditions of service.

I claim:—

1. A triple valve comprising a valve member operable pneumatically in braking actions, a second valve member operable independently of the first-named valve member, said valve members being seated within the other and means for operating said second valve member.

2. A triple valve comprising a rotary valve member operable by variable air pressures, a second rotary valve member, said valve members being mounted one within the other and means for operating the second rotary valve member.

3. A triple valve comprising a valve member operable pneumatically in braking actions, a second valve member operable independently of the first-named valve member, said valve members being mounted for movement one within the other, and means for electrically operating said second valve member.

4. A triple valve comprising a rotary valve member operable by variable air pressures, a second rotary valve member, said valve members being mounted for movement one within the other, and means for electrically operating the second rotary valve member.

5. A triple valve including a rotary valve member controlled by variations of air pressures, a second rotary valve member, said valve members being concentrically mounted and provided with coacting ports, and means for electrically operating the second valve member.

6. A triple valve including a pair of concentric rotary valve members, means for pneumatically operating one of said valve members, and means for electrically operating the other valve member.

7. A triple valve comprising a hollow rotary valve member operable by variations of pressure in the brake system, said valve member being provided with ports and movable to different positions for service, emergency and exhaust actions, a second rotary valve arranged within the first-named valve and provided with ports and operable to control the ports in the first-named valve for an emergency action, and means for operating the second-named rotary valve.

8. A triple valve including a rotary valve member controlled by variations of air pressures, a second rotary valve member, said valve members being concentrically mounted, and means for operating the second valve member.

9. A triple valve including a valve casing having a pressure chamber communicating at opposite sides with the train pipe and auxiliary reservoir respectively, a diaphragm in said chamber, a rotary valve controlling communication between the auxiliary reservoir, brake cylinder and train pipe for recharging, service, emergency and exhaust actions, a second rotary valve operable in the running position of the first-named valve to control ports thereof for an emergency action, and means for operating the second-named valve.

10. A triple valve including a valve member operable for recharging, exhaust, service and emergency actions, a second valve operable for an emergency action to establish communication between the train pipe and reservoir and the brake cylinder through the first-named valve, and means for operating the second-named valve independently of the first-named valve.

11. A triple valve including a pair of concentric rotary valve members, means for pneumatically operating one of said valve members and means for independently operating the other valve member.

12. A triple valve including a valve member having the usual service, exhaust, emergency and recharging actions, and having a normal running position, a second valve having a passage for the flow of air when the first-named valve is adjusted for service, emergency and recharging actions, and adjustable to control communication between the train pipe and auxiliary reservoir and the brake cylinder through the exhaust port of the first-named valve when the latter is in running position, and means for operating the second-named valve independently of the first-named valve.

13. A triple valve including a rotary valve member having a normal exhaust position and adjustable to control ports and passages for service, emergency and recharge actions, means for controlling said valve by variations between train pipe and auxiliary reservoir pressures, a second valve arranged for the passage of air therethrough in the positions of the first-named valve for service, emergency and recharging actions, and adjustable to establish communication between the train pipe and auxiliary reservoir and the brake cylinder through the exhaust port of the first-named valve in the running position of the latter, and means for operating the second-named valve independently of the first-named valve.

14. A triple valve comprising a pair of concentrically mounted rotary valves, one being operable by variations of air pressures to perform the usual triple valve functions, and the other being operable by independent means for controlling ports in the first-named valve for an emergency action.

15. A triple valve comprising rotary valve members, one adjustable to perform the usual triple valve functions, and the other adjustable to perform an emergency action, and means for electrically operating the second-named valve.

16. A triple valve including a rotary valve member, means for pneumatically operating the same to perform the usual triple valve functions, a second rotary valve member arranged within the first-named rotary valve member and coöperating therewith, and means for adjusting the second-named valve member for an emergency action.

17. A triple valve including a rotary valve member, a pressure chamber communicating at its opposite sides with the train pipe and auxiliary reservoir respectively, a diaphragm in said chamber subjected to train line and auxiliary reservoir pressure, a cushioning and controlling spring on the auxiliary reservoir side of said diaphragm operating to return the diaphragm to normal position after a reduction in the auxiliary reservoir pressure and a subsequent equalization of such pressure with the train line pressure, and a cushioning spring on the train line side of the diaphragm arranged to permit service motion of said diaphragm without resistance, and to establish a yielding resistance to emergency application motion of the diaphragm under a further reduction of train line pressure.

18. A triple valve including a hollow rotary valve member operable by variations of air pressure, and provided with ports therein, a second rotary valve member arranged within the first-named valve member and provided with coöperating ports, and means for independently operating the second valve member.

19. A triple valve including a hollow rotary valve member operable by variations of air pressure and having ports therein, a second rotary valve member arranged within the first-named valve member and provided with coöperating ports, and means for electrically operating said second valve member.

20. A triple valve including a pair of valve members arranged one within the other and provided with coöperating ports, and means for independently operating said valve members, one of said valve members being responsive to variable air pressures.

21. A triple valve including a pair of valve members, one normally operative for the usual air brake actions, and the other independently operative to control the ports in the first-named valve member for conjoint or independent braking actions, and means for operating the respective valve members.

22. A triple valve including a rotary valve member having ports therein and pneumatically operable to perform the ordinary triple valve functions, a second valve having ports therein to normally coöperate with the ports in the first-named valve for such braking actions, and means for adjusting the second-named valve for a variation in the arrangement of the ports in the respective valve members for determined actions.

23. A triple valve including a pair of rotary concentric valve members provided with coöperating ports, means rendering one of said valve members responsive to variations of fluid pressures, and means rendering the other valve member responsive to electrical impulses.

24. A triple valve including a casing having feed, exhaust and auxiliary exhaust ports, a pair of rotary concentric valves provided with coöperating ports and controlling the ports in the casing, means for operating the respective valves, and a manually operable valve controlling the auxiliary exhaust port.

In testimony whereof I affix my signature in presence of a witness.

WILLIAM GEORGE CANION.

Witness:
ZELLA KUHN.

Copies of this patent may be obtained for five cents each, by addressing the "Commissioner of Patents, Washington, D. C."